Feb. 18, 1941.  V. G. JARMAN  2,232,534
MATERIAL FEEDING DEVICE
Filed July 26, 1939

INVENTOR
V. G. JARMAN
BY E. R. Nowlan
ATTORNEY

Patented Feb. 18, 1941

2,232,534

UNITED STATES PATENT OFFICE 2,232,534

MATERIAL FEEDING DEVICE

Vincent G. Jarman, Scotch Plains, N. J., assignor to Western Electric Company, Incorporated, New York, N. Y., a corporation of New York Application July 26, 1939, Serial No. 286,502

3 Claims. (Cl. 29—62)

This invention relates to a material feeding device, and more particularly to a feed finger and pads for feeding rod stock in screw machines and the like.

Automatic screw machines have been in use for many years in the manufacture of an innumerable variety of metal and other articles and parts. In all such machines, however, the arrangement for feeding the rod stock intermittently to the tool turret has remained substantially the same, comprising a spring collet through which the rod passes and which grips the rod to hold it stationary in space and rotate it on its axis during a sequence of operations, and a hollow, generally cylindrical feed finger (with or without pads in the gripping end) through which the rod also extends behind the collet and which rotates and also has a reciprocating motion to feed the rod through the collet between cycles or sequences of operations. At the last or next to the last feeding stroke of the finger on each length of rod, the finger is withdrawn entirely from the rod stub and again forced thereover. As hitherto constructed, the form and structure of the feed fingers has necessitated a considerable degree of bevelling or chamfering of the rear end of every rod put through such a machine. Otherwise the finger may often jam again the rod stub and stall or injure the machine.

An object of the present invention is to provide a feed finger and pads for feeding rod stock in machines, so proportioned and constructed that the customary chamfering of the rear end of each length of rod stock may be omitted.

One embodiment of the invention may present a feed finger of hollow substantially cylindrical form having removable interchangeable pad members mounted within the front end thereof and formed to overhang and cover the said front end and further formed with inwardly leading bevels at the outer ends of the pads.

Figure 1:
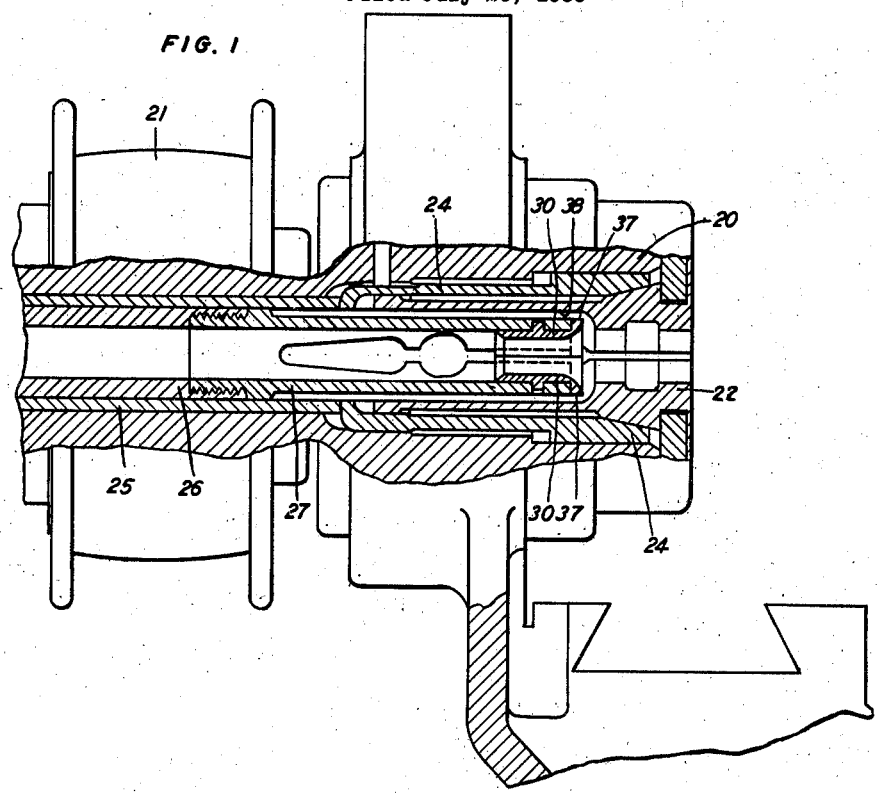
Figure 2:
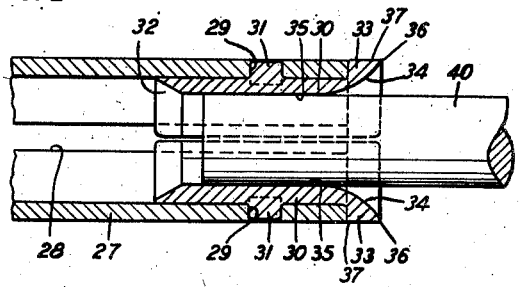

Other objects, features and advantages of the invention will appear from the following detailed description of one embodiment thereof taken in connection with the accompanying drawing in which like reference numerals are applied to identical parts in several figures and in which Fig. 1 is a broken view in side elevation and partly in longitudinal central vertical section of the spindle of a standard type automatic screw machine comprising a feed finger and pads constructed in accordance with the invention; and Fig. 2 is a detached enlarged broken longitudinal central section of the forward end of the feed finger and its pads.

The invention, as herein disclosed, is shown as embodied in a feed finger and pads comprised in the spindle of a standard commercial automatic screw machine, substantially as manufactured by a number of well known makers of screw machines at the present time. Only so much of the spindle of the machine is shown in Fig. 1 as is necessary to make the nature and mode of operation of the invention clear to those skilled in this art. For further details if required, reference may be had to any modern textbook on metal working machines, e. g. to pages 16 et seq. and especially to Fig. 20 of volume II of "Engineering Shop Practice" by Orlan W. Boston, published in 1935 by John Wiley & Sons, Inc.

This spindle comprises a horizontal tubular shaft 20 mounted to be rotatable and to be driven by a pulley 21 from means not shown. Within the outer or right hand end of this shaft is a split spring collet 22 whose outer ends are proportioned and arranged to hold and grip a piece of rod stock when positioned coaxially therein and when the collet is compressed by the tubular longitudinally slidable wedge member 24 interposed between the collet and the shaft. The collet wedge 24 is driven to the right to compress the collet to grip a stock rod, by a tubular actuating member 25 actuated in turn by suitable cam means not shown. A second tubular actuating member 26 also longitudinally reciprocable by cam means not shown is slidable within the member 25 and has the feed finger 27 secured by complementary screw portions in the outer end of the member 26.

The feed finger 27 is substantially a hollow cylinder of spring steel or the like material, with two diametrically opposed longitudinal slots 28 (only one shown) extending from the forward end back over about four-fifths of the length of the finger. After these slots have been cut and the whole finger fully formed, the two parts above and below these slots are brought together at the right hand end and held together while the finger is heat treated and given its spring temper, so that they take a set in this position and thus clamp the two pads 30 firmly in place, when these are forced into the finger into the positions shown in both figures.

The removable and interchangeable pads 30 are positioned within the outer end of the finger 27 and held in place by suitable means such as the lugs 31 on the pads entering corresponding apertures 29 in the finger. The pads 30 are substantially half hollow cylinders, ordinarily formed from a complete cylindrical blank and sawn apart along a diametrical plane. At the near end they are formed with an inner outwardly widening bevel 32 running to nearly a knife edge at the rear and enabling the rod of stock to be pushed between the pads when a new rod is inserted. The inner surfaces 35 of the pads, as also those of the gripping members of the collet 22, are here shown as cylindrical for use with a cylindrical rod. These may, however, also be prismatic with a square, hexagonal or other cross-section if rods of other shapes are to be used. The outer end of the pads is formed with an integral outer flange 33 extending over the squared off end of the finger body and flush with the outer surface of the finger to give the front or outer ends of the pads the greatest possible radius. These outer ends are formed with an inner outwardly widening bevel or chamfer 34 leading from the inner cylindrical surfaces 35 to the extreme outer edges 36.

There is no rod shown in the apparatus in Fig. 1. Hence the two pads 30 are shown pressed together into mutual contact, and there is a relatively wide clearance between the surfaces 37 at the peripheries of the flanges 33 and the inner surrounding surface 38 of the collet. When a rod 40 is pushed into place between the pads, as shown in Fig. 2, the pads are forced apart as indicated in Fig. 2, and the clearance between the surfaces 37 and 38 is diminished. In any case the outer diameter of the flanges 33 is made as large as this clearance will allow in most cases, in order that the tapering throat formed by the bevels or chamfers 34 may have the widest possible outer opening. The bevels 34 may be made straight if the material available will permit. As shown they are curved in order not to weaken the pads unduly at the juncture of the flanges 33 with the pad bodies proper.

In operation a piece of rod stock is pushed in from the rear through the hollow shaft 26, while the wedging member 24 is retired, leaving the collet 22 free to spring open and pass the rod. The rod is pushed on through the finger until it is stopped by the tool turret (not shown) of the machine, in the usual manner. The wedge member 24 is then forced forward, causing the collet 22 to grip the rod and to drive it in rotation. The several operations desired are then performed on the outer end of the rod in the usual manner, the last operation being to cut off the completed article from the end of the rod.

Meanwhile the finger 27 and its pads 30 have been retired a predetermined distance sliding along the rod, which is held by the firmer grip of the collet thereon, against longitudinal displacement. The wedge 24 is then retired, freeing the rod in the collet, and the finger and pads move forward again to the position of Fig. 1, carrying the rod along until the latter again strikes the tool turret and stops. Ordinarily, the length of travel of the finger and pads is so gauged and adjusted that these slide on along the rod a small distance before reaching the end of their travel, to ensure a full length feed of the stock. The collet is then clamped down on the stock and the sequence of events repeated.

The rod is thus used up segment by segment, until some such state of affairs is reached as is shown in Fig. 2. Here it is to be conceived that the finger and pads have just completed a feeding stroke forward and the collet (not shown in this figure) has taken hold to drive the rod 40 in rotation. The finger and pads will now retire to the left and slip off the left hand end of the remaining rod stub 40. A little later these parts will be cammed forward again for the next feeding stroke. With the form of pads disclosed, having the wide throat formed by the bevels 34, it is impossible for the rod, however battered and misshapen its rear end within reason, to fail to enter between the pads 30 and spring them apart.

In all machines of the prior art, where pads were used, the pads did not extend radially out beyond the inner cylindrical surface of the finger; and whether pads were used or not, there was a transversely flat surface at the front end of the finger or finger and pads against which a rod 40, if slightly misshapen, could flatly abut and jam, with the result that the rod stub would be forced positively, without yielding by sliding in the finger, against the turret by the slightly overrunning finger, with disastrous results.

To obviate this, it has been the universal custom in the past to point or bevel the rear end of each individual length of rod stock before inserting it into the machine. This involves hand labor, as each piece of stock must be separately placed and adjusted in a lathe or other tool and its end pointed; or, in some instances, the end may be bevelled or pointed with a hand file.

By the device of the invention, any piece of stock which will pass forwardly through the pads when the finger is retired will also pass rearwardly between the pads, when the finger again moves forward. Hence it is possible to feed even stock cut to length with shears only, on a machine equipped with the device of the invention, an impossibility with the feeding devices of the prior art, because of the projecting tail frequently left at one side of the end of a piece of stock when cut off with shears.

Modifications and changes may be made in the particular illustrative embodiment of the invention herein disclosed, without departing from the spirit and scope of the invention as pointed out in and limited solely by the appended claims.

What is claimed is:

1. A device for feeding rod stock, comprising a hollow member through which a piece of rod stock may be passed, and a pad member interposed between the hollow member and a piece of stock therein and extending radially outwardly over an end of the hollow member and formed with a stock guiding surface extending outwardly beyond the inner surface of the hollow member.

2. A device for feeding rod stock, comprising a hollow member through which a piece of rod stock may be passed, and a plurality of pad members in annular arrangement within the hollow member at one end thereof, each of said pad members being formed to overhang the end of the hollow member radially outwardly and formed on the overhanging portion thereof with a stock guiding surface extending outwardly beyond the inner surface of the hollow member.

3. A device for feeding rod stock, comprising a hollow member through which a piece of rod stock may be passed, and a plurality of pad members in annular arrangement within the hollow member at one end thereof, each of said pad members being formed to overhang the end of the hollow member radially outwardly and formed on the overhanging portion thereof with an inwardly sloping bevel to act as a stock guiding surface and extending outwardly beyond the inner surface of the hollow member.

VINCENT G. JARMAN.